United States Patent
Kinoshita et al.

(10) Patent No.: US 8,274,637 B2
(45) Date of Patent: Sep. 25, 2012

(54) LIQUID CRYSTAL PANEL HAVING AN OPENING IN TRANSPARENT CONDUCTIVE LAYER FOR VENTING GAS

(75) Inventors: Yoshitaka Kinoshita, Tokyo (JP);
Atsushi Shiraishi, Sayama (JP);
Toshihiko Satou, Hachinohe (JP);
Hiroyuki Tsukada, Kodaira (JP)

(73) Assignee: Citizen Holdings Co., Ltd., Tokyo (JP)

( * ) Notice: Subject to any disclaimer, the term of this patent is extended or adjusted under 35 U.S.C. 154(b) by 508 days.

(21) Appl. No.: 12/521,230

(22) PCT Filed: Nov. 28, 2007

(86) PCT No.: PCT/JP2007/073433
§ 371 (c)(1),
(2), (4) Date: Jun. 25, 2009

(87) PCT Pub. No.: WO2008/081678
PCT Pub. Date: Jul. 10, 2008

(65) Prior Publication Data
US 2010/0026947 A1 Feb. 4, 2010

(30) Foreign Application Priority Data

Dec. 28, 2006 (JP) .................................. 2006-355637
Mar. 26, 2007 (JP) .................................. 2007-079280
Mar. 27, 2007 (JP) .................................. 2007-081778

(51) Int. Cl.
*G02F 1/1333* (2006.01)

(52) U.S. Cl. ........................................ 349/158; 349/122

(58) Field of Classification Search .................. 349/122, 349/155, 158
See application file for complete search history.

(56) References Cited

U.S. PATENT DOCUMENTS

| 5,610,742 A * | 3/1997 | Hinata et al. ................. 349/122 |
| 7,705,943 B2 | 4/2010 | Kume et al. |
| 2005/0259211 A1* | 11/2005 | Stephenson et al. .......... 349/167 |

FOREIGN PATENT DOCUMENTS

| JP | 05-323336 | 12/1993 |
| JP | 2000-284310 A | 10/2000 |
| JP | 2001-83529 | 3/2001 |
| JP | 2002-107705 | 4/2002 |
| JP | 2003-84290 | 3/2003 |
| JP | 2005-043696 | 2/2005 |
| JP | 2005-172944 | 6/2005 |
| JP | 2006-162647 | 6/2006 |
| WO | WO00/52522 | 9/2000 |
| WO | WO 2005091257 A1 * | 9/2005 |

* cited by examiner

*Primary Examiner* — Michael Caley
(74) *Attorney, Agent, or Firm* — Finnegan, Henderson, Farabow, Garrett & Dunner, L.L.P.

(57) ABSTRACT

The present invention is directed to the provision of a liquid crystal panel that can solve the problem that bubbles are formed in a liquid crystal layer. More specifically, the invention provides a liquid crystal panel includes a first plastic substrate; a second plastic substrate, a liquid crystal layer sealed between the first and second plastic substrates, a transparent conductive layer provided on the first or the second plastic substrate and having a patterned region for driving the liquid crystal layer, and an opening provided in the patterned region of the transparent conductive layer.

12 Claims, 14 Drawing Sheets

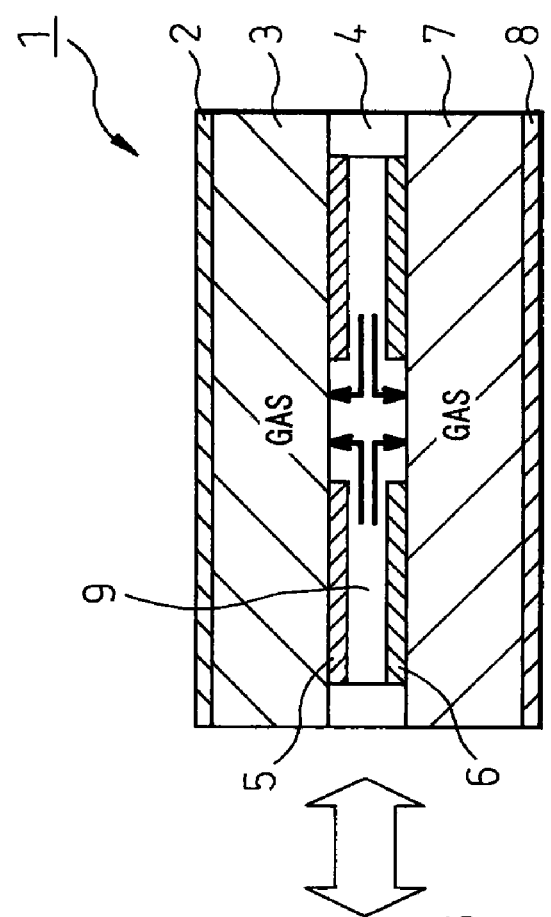

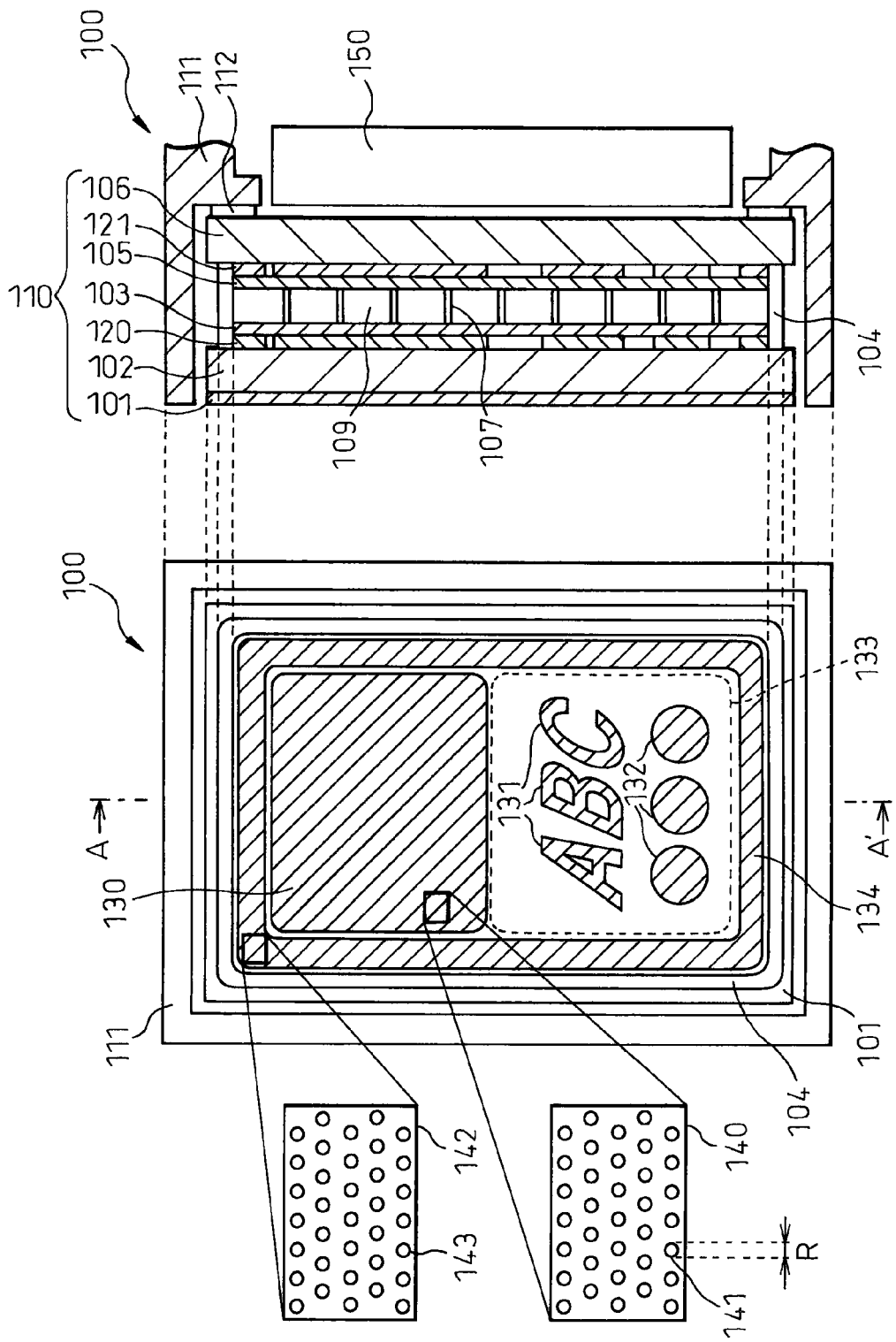

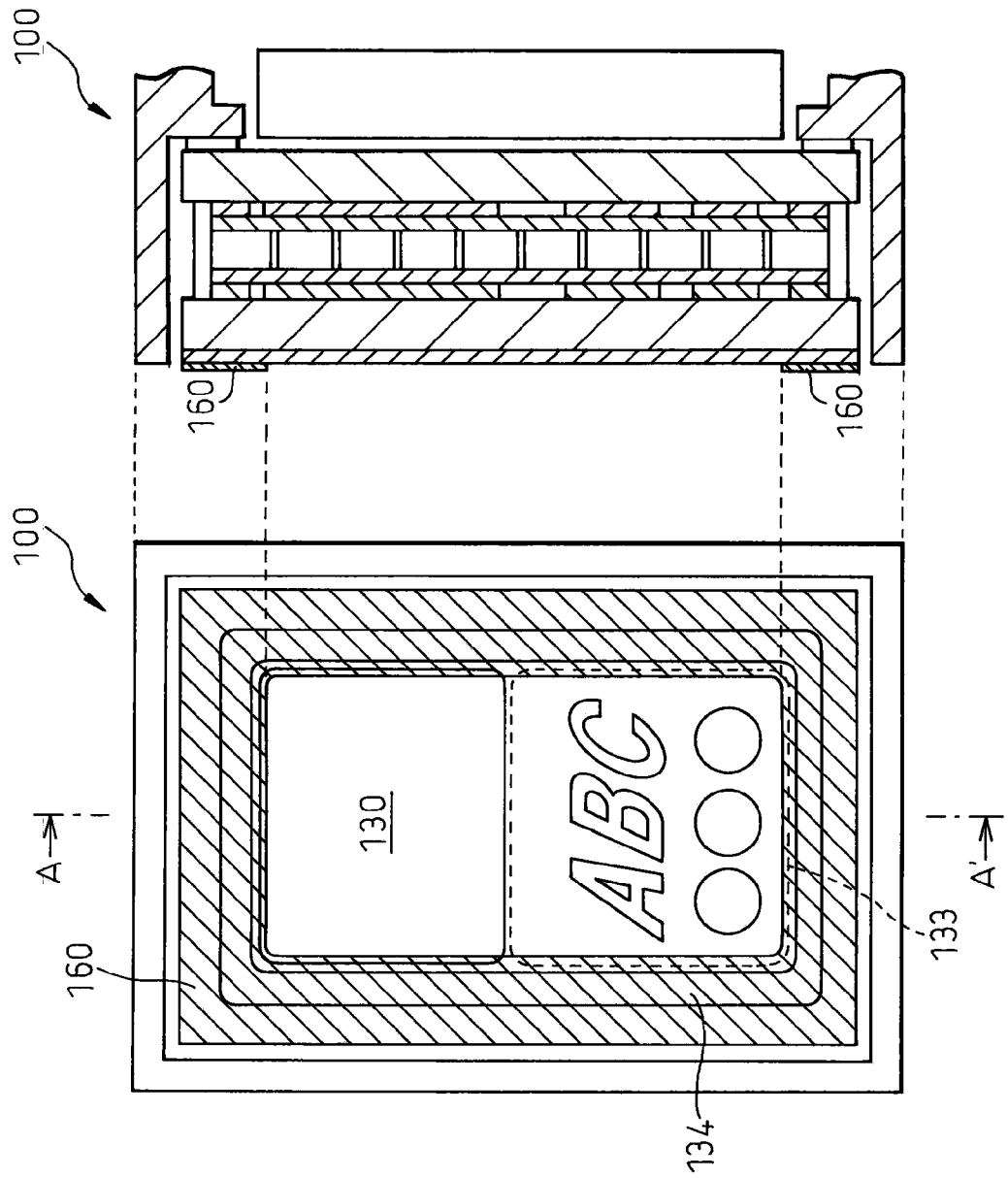

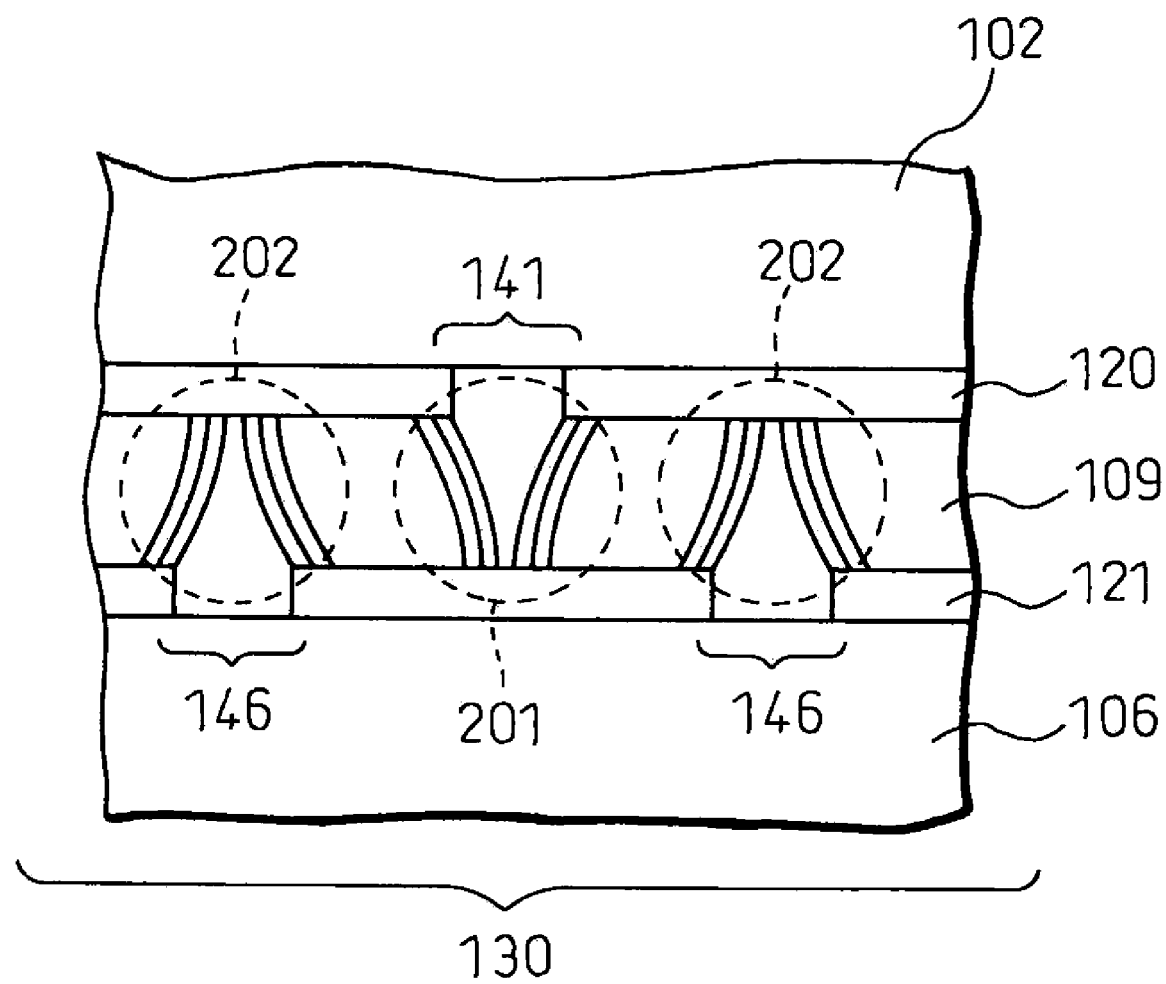

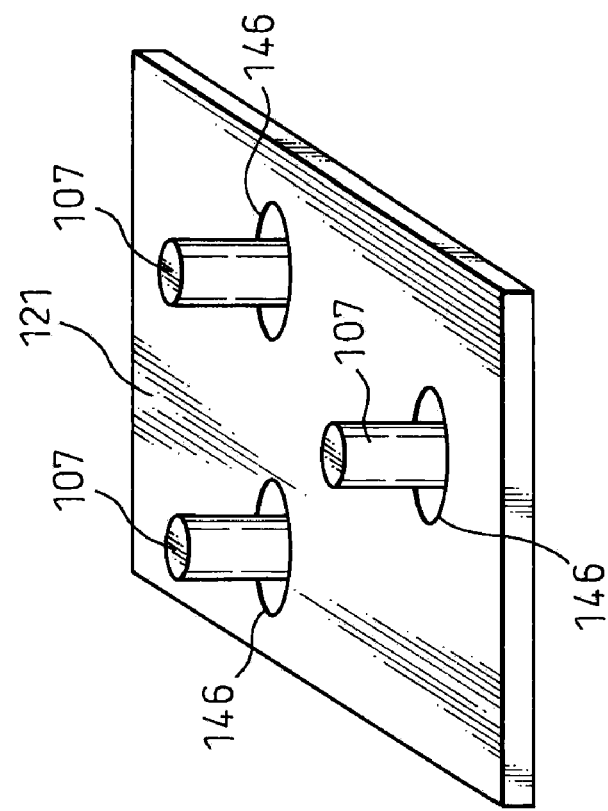
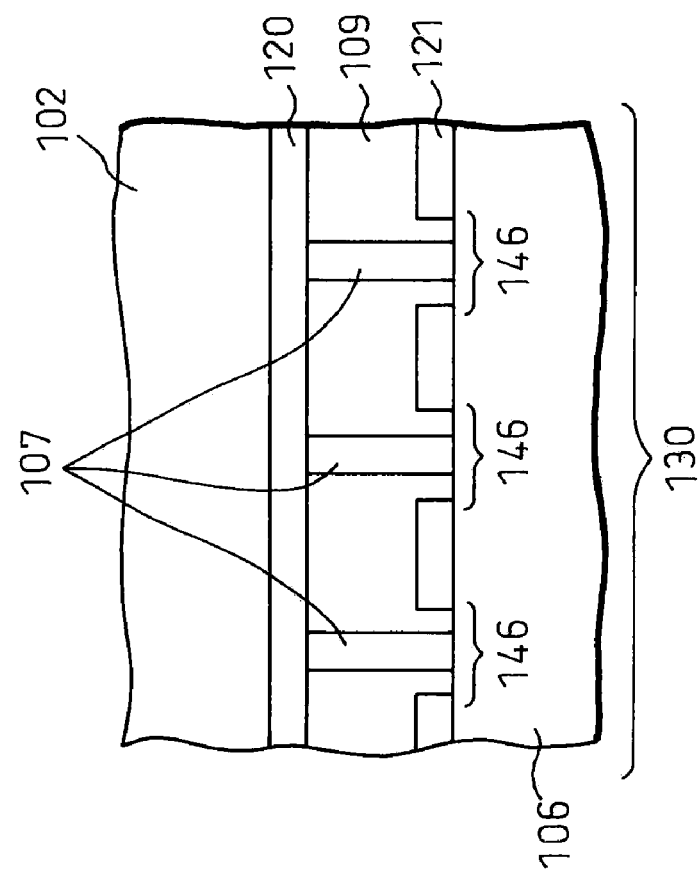

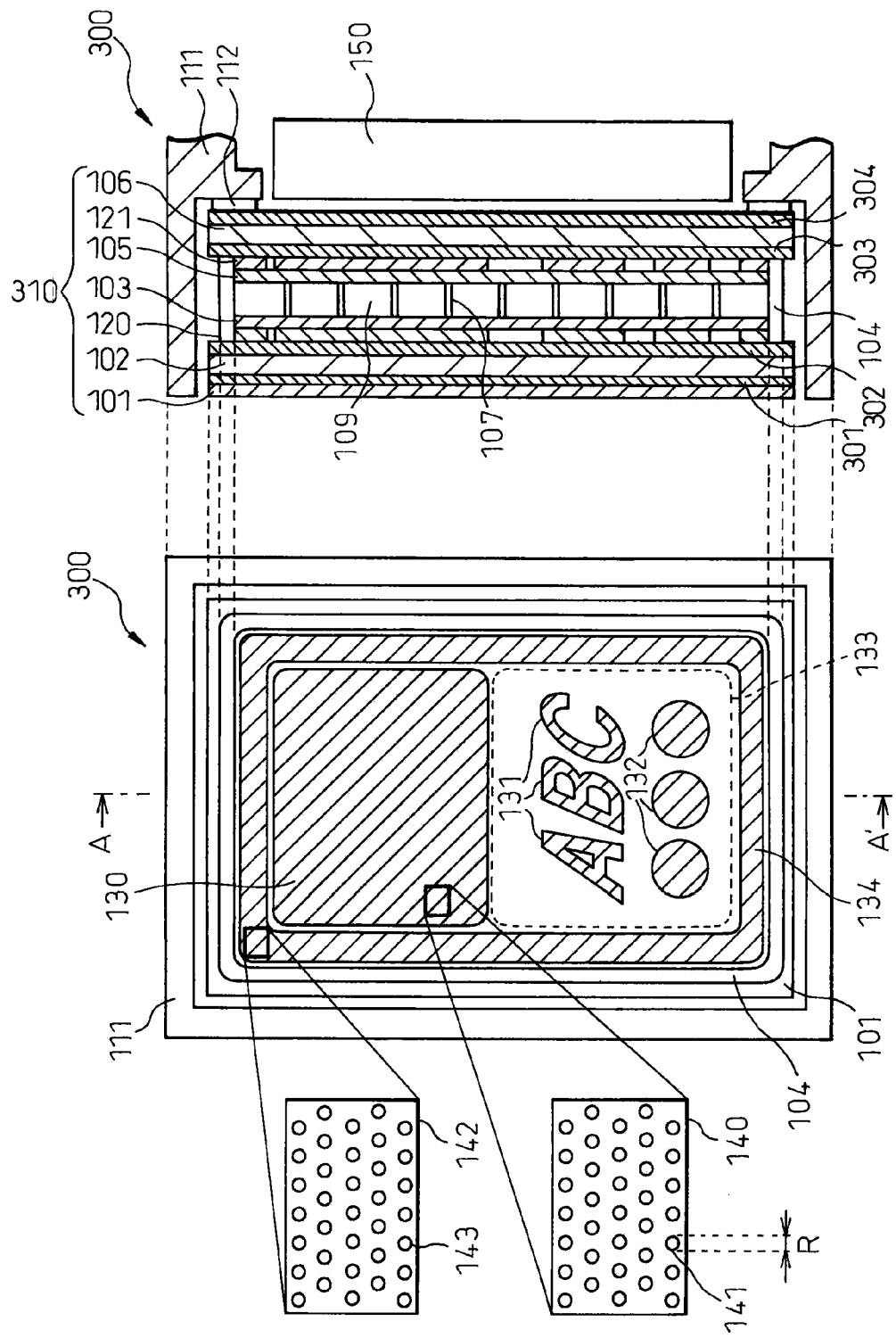

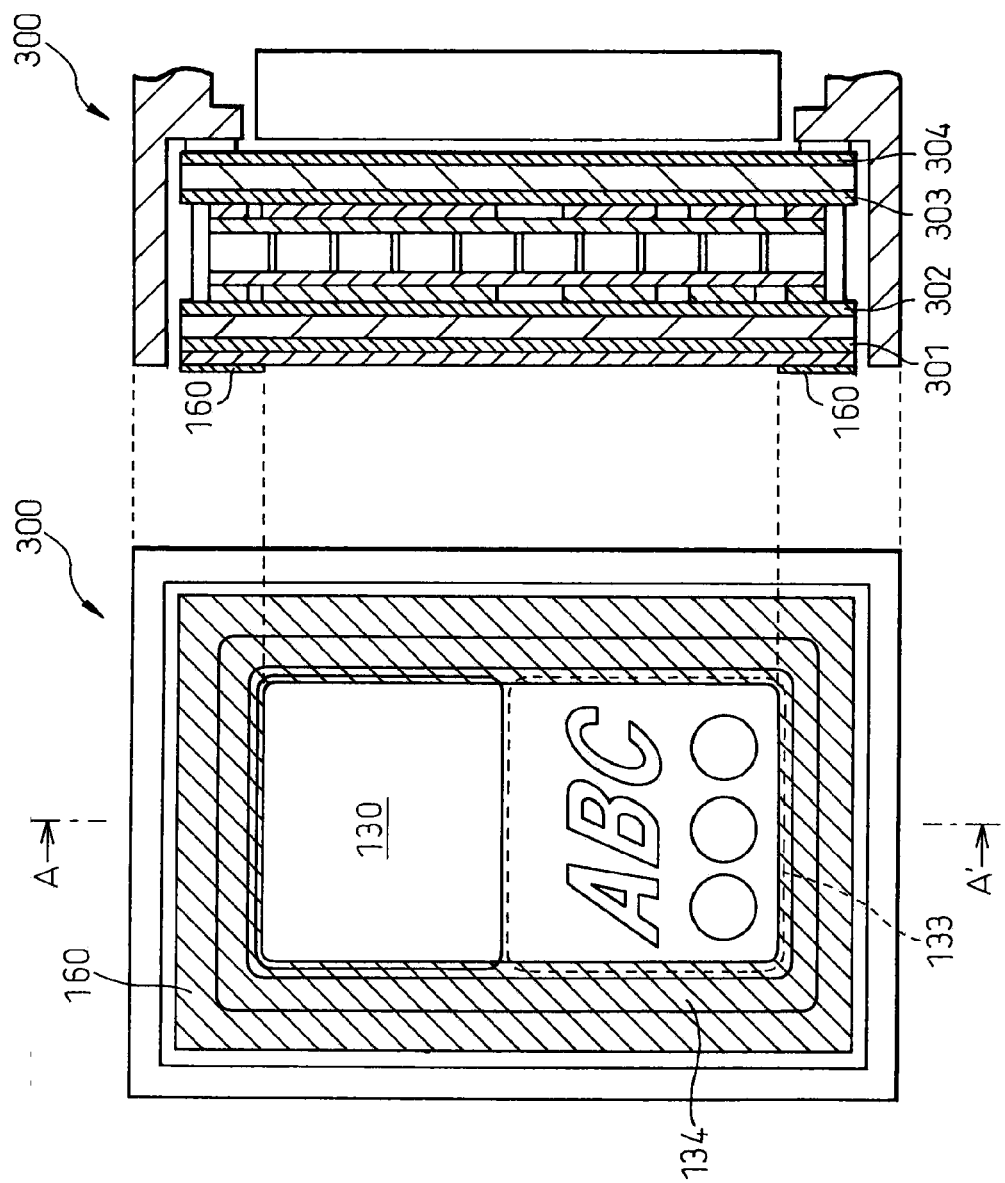

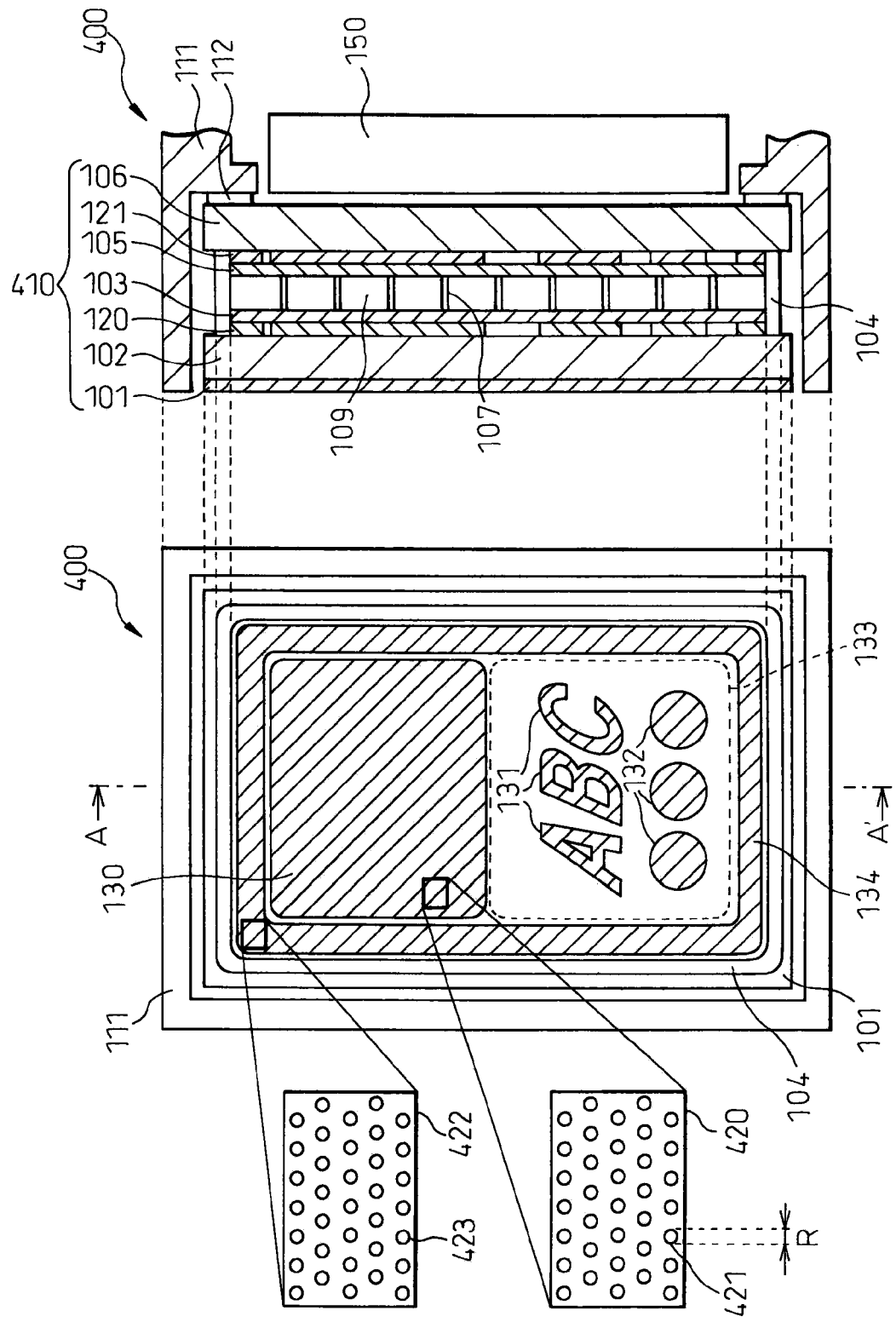

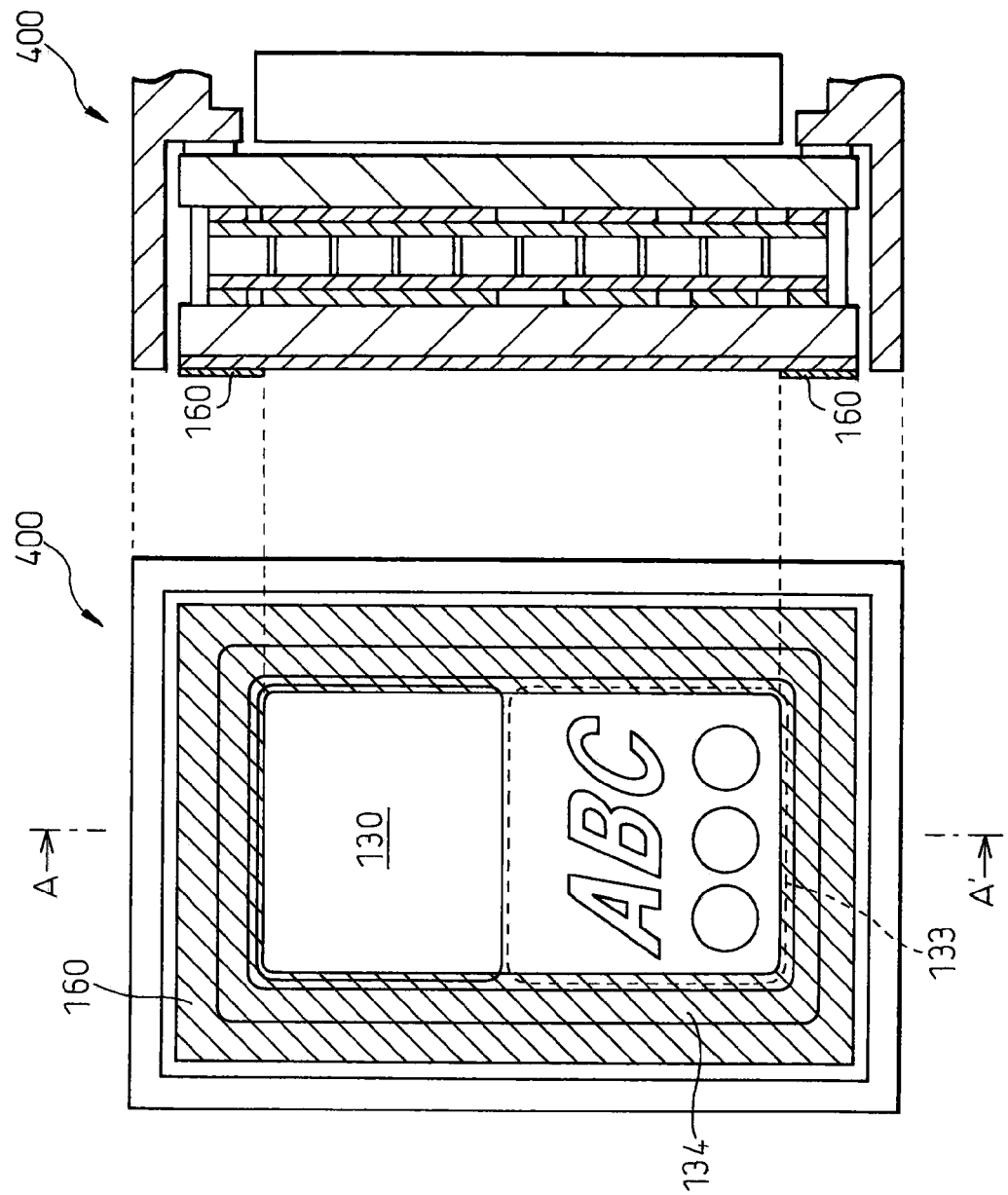

LIQUID CRYSTAL PANEL HAVING AN OPENING IN TRANSPARENT CONDUCTIVE LAYER FOR VENTING GAS

FIELD OF THE INVENTION

The present invention relates to a liquid crystal panel, and more particularly to a liquid crystal panel that uses plastic substrates.

BACKGROUND OF THE INVENTION

Development of liquid crystal display devices that use so-called plastic film substrates has been proceeding for many years in an effort to utilize a thin and lightweight construction. In recent years, other features, such as an unbreakable and bendable structure and great freedom in planar shape design, have also been attracting attention, and many applied products have been proposed.

In a liquid crystal display device constructed by sealing a liquid crystal between film substrates, it is known to provide a protective film of a transparent conductive material such as ITO in order to reduce the infiltration of air into the region where the liquid crystal is sealed (for example, patent document 1). In the liquid crystal display device described in patent document 1, protective layers formed from an inorganic transparent conductive material having extremely low permeability, such as ITO, are provided in a non-display area where the opposing electrodes on the top and bottom film substrates are not formed, thereby reducing the infiltration of air through the film substrates and thus attempting to suppress the occurrence of display defects due to air bubbles.

Patent document 1: Japanese Unexamined Patent Publication No. 2000-284310 (FIG. 2)

SUMMARY OF THE INVENTION

FIG. 1 is a diagram explaining how bubbles are formed in the liquid crystal sealing region.

FIG. 1(a) shows the case where the liquid crystal panel 1 is placed in a high-temperature condition, and FIG. 1(b) shows the case where the liquid crystal panel 1 is placed in a low-temperature condition.

The liquid crystal panel 1 comprises a top layer (inorganic barrier layer, polarizer, etc.) 2, a first plastic substrate 3, a sealing member 4, a first transparent conductive film 5, a second transparent conductive film 6, a second plastic substrate 7, a bottom layer (inorganic barrier layer, polarizer, etc.) 8, and a liquid crystal layer 9 sealed between the first and second plastic substrates.

When the liquid crystal panel 1 is placed in the high-temperature condition, gas infiltrates into the liquid crystal layer 9 through the interstices of the transparent conductive films by passing through the first and second plastic substrates 3 and 7, etc. (see FIG. 1(a)). Then, when the liquid crystal panel 1 is placed back into the low-temperature condition, the gas trapped in the liquid crystal layer 9 is vented outside the liquid crystal layer 9 through the interstices of the transparent conductive films and the first and second plastic substrates 3 and 7, etc. (see FIG. 1(b)). Usually, when the liquid crystal panel 1 cycles between the high-temperature condition and the low-temperature condition, it is presumed that the migration of gas, such as shown in FIGS. 1(a) and 1(b), takes place. Since the gas infiltrating into the liquid crystal layer 9 does not immediately turn into bubbles but some of it is absorbed into the liquid crystal layer, it is believed that bubbles will not form if the gas is vented outside before exceeding the saturation. However, if an impact is applied to the liquid crystal panel 1, for example, if it is dropped, the gas trapped inside the liquid crystal layer 9 may turn into bubbles. The infiltration of gas into the liquid crystal layer 9 tends to occur particularly in the case of a liquid crystal panel constructed using plastic substrates.

FIG. 2 is a diagram for explaining portions where bubbles are easily formed.

FIG. 2(a) shows one example of a front view of the liquid crystal panel 1, and FIG. 2(b) shows an example in which bubbles are formed in the liquid crystal panel 1 as a result of cycling between the high-temperature condition and the low-temperature condition.

The liquid crystal panel 1 shown in FIG. 2 includes a first region 10 where the transparent conductive films are etched for controlling the display of character and numeric keys, etc., and a large patterned region 11 where the transparent conductive films are left unetched (formed all over the area) for such purposes as providing the display area.

As described with reference to FIGS. 1(a) and 1(b), when the liquid crystal panel 1 is placed in the high-temperature condition, gas infiltrates into the liquid crystal layer 9 through the interstices of the transparent conductive films, and when the liquid crystal panel 1 is placed back into the low-temperature condition, the gas is vented through the interstices of the transparent conductive films. Accordingly, in the region such as the first region 10 where the transparent conductive films are etched (i.e., the region where the transparent conductive films have many interstices), the gas easily infiltrates but, at the same time, the gas is easily vented, so that in the first region 10, there is little chance of bubbles occurring in the liquid crystal layer 9 for an extended period of time.

On the other hand, in the region such as the large patterned region 11 where the transparent conductive films are left unetched (the transparent conductive films are formed all over and there are very few interstices), the gas does not easily infiltrate, but there has been a problem that once the gas infiltrates, it is not easily vented, which tends to form gas bubbles (see FIG. 2(b)).

Accordingly, it is an object of the present invention to provide a liquid crystal panel that can solve the problem that bubbles are formed in the liquid crystal layer.

It is another object of the invention to provide a liquid crystal panel that uses plastic substrates wherein provisions are made to suppress the formation of bubbles in the large patterned region.

A liquid crystal panel according to the present invention includes a first plastic substrate, a second plastic substrate, a liquid crystal layer sealed between the first and second plastic substrates, a transparent conductive layer provided on the first or the second plastic substrate and having a patterned region for driving the liquid crystal layer, and an opening provided in the patterned region of the transparent conductive layer. This construction allows the gas trapped in the liquid crystal layer to be easily vented through the opening, thereby suppressing the formation of bubbles in the liquid crystal layer.

A liquid crystal panel according to the present invention includes a first plastic substrate, a second plastic substrate, a liquid crystal layer sealed between the first and second plastic substrates, a transparent conductive layer provided on the first or the second plastic substrate in order to drive the liquid crystal layer, a spacer disposed between the first and second plastic substrates, and an opening provided so as to encircle the spacer. This construction allows the gas trapped in the liquid crystal layer to be easily vented through the opening provided encircling the spacer, thereby suppressing the formation of bubbles in the liquid crystal layer.

A liquid crystal panel according to the present invention includes a first plastic substrate, a second plastic substrate, a liquid crystal layer sealed between the first and second plastic substrates, a first transparent conductive layer provided on the first plastic substrate and having a first patterned region for driving the liquid crystal layer, a second transparent conductive layer provided on the second plastic substrate and having a second patterned region for driving the liquid crystal layer, and an opening provided in each of the first and second transparent conductive layers. This construction allows the gas trapped in the liquid crystal layer to be easily vented through the opening, thereby suppressing the formation of bubbles in the liquid crystal layer.

A liquid crystal panel according to the present invention includes a first plastic substrate, a second plastic substrate, a liquid crystal layer sealed between the first and second plastic substrates, and a transparent conductive layer provided on the first or the second plastic substrate and having a patterned region for driving the liquid crystal layer, wherein a gas barrier layer is formed at least on a side of each of the first and second plastic substrates which faces the sealed liquid crystal layer, and an opening is provided in the patterned region of the transparent conductive layer.

Preferably, in the liquid crystal panel of the present invention, the gas barrier layer is formed on both sides of each of the first and second plastic substrates.

Preferably, in the liquid crystal panel of the present invention, the patterned region is larger than about 200 μm square.

Preferably, in the liquid crystal panel of the present invention, the opening is smaller than about 100 μm.

Preferably, in the liquid crystal panel of the present invention, the opening is provided in each of the transparent conductive layers provided on the first and second plastic substrates.

Preferably, in the liquid crystal panel of the present invention, a spacer is provided between the first and second plastic substrates, and the opening is provided so as to encircle the spacer.

A liquid crystal panel according to the present invention includes a first plastic substrate, a second plastic substrate, a liquid crystal layer sealed between the first and second plastic substrates, and a transparent conductive layer provided on the first or the second plastic substrate and having a patterned region for driving the liquid crystal layer, wherein a plurality of openings are provided in the patterned region, and the plurality of openings have a plurality of kinds of shapes.

A liquid crystal panel according to the present invention includes a first plastic substrate, a second plastic substrate, a liquid crystal layer sealed between the first and second plastic substrates, and a transparent conductive layer provided on the first or the second plastic substrate and having a patterned region for driving the liquid crystal layer, wherein a plurality of openings are provided in the patterned region, the openings are arranged in a random manner.

Preferably, in the liquid crystal panel of the present invention, the transparent conductive layer is provided on each of the first and second plastic substrates, and the opening is provided in each transparent conductive layer.

Preferably, in the liquid crystal panel of the present invention, a spacer is provided between the first and second plastic substrates, and the opening is provided so as to encircle the spacer.

In the liquid crystal panel according to the present invention, since the openings are provided in the large patterned region, the gas is vented through the openings, and the formation of bubbles in the liquid crystal layer can thus be prevented.

In the liquid crystal panel of the present invention which uses flexible and gas-permeable substrate such as plastic films, since the barrier layers whose gas permeability is not so low are provided on both sides of the substrate support member, and since the openings for passing the gas therethrough are provided in the solid region formed from a transparent electrode material and having a relatively large area, the internal condition of the liquid crystal layer can be brought slowly toward the equilibrium state, thereby eliminating the bubbles formed inside the liquid crystal layer that overlaps the solid region two-dimensionally.

In the liquid crystal panel according to the present invention, since the openings are provided in the large patterned region, the absorption of gas into the substrates is promoted, and the gas infiltrated into the liquid crystal layer can be easily vented through the openings, thus serving to prevent the formation of bubbles in the liquid crystal layer.

In the liquid crystal panel according to the present invention, by arranging the openings in a random and irregular manner, it is possible to prevent the formation of interference fringes that occur depending on the relationship with the periodicity of color filters, etc., disposed behind the electrodes and openings.

In the liquid crystal panel fabrication process, if the step of baking the first and second plastic substrates is provided before sealing the liquid crystal layer between the substrates, the latent gas residing in the first and second plastic substrates can be expelled outside the substrates through the openings provided in the transparent conductive layers. By thus reducing the latent gas residing in the first and second plastic substrates, it is possible to reduce the amount of gas infiltrating into the liquid crystal layer after the liquid crystal layer is injected.

BRIEF DESCRIPTION OF THE DRAWINGS

FIG. 1(*a*) is a diagram showing an example of a liquid crystal panel placed in a high-temperature condition, and FIG. 1(*b*) is a diagram showing an example of a liquid crystal panel placed in a low-temperature condition.

FIG. 3(*a*) is a diagram showing a front view of a display apparatus 100 which includes a liquid crystal panel 110 according to the present invention, and FIG. 3(*b*) is a cross-sectional view of FIG. 3(*a*).

FIG. 4(*a*) is a diagram showing an example in which a light-shielding tape is applied to the display apparatus 100, and FIG. 4(*b*) is a cross-sectional view of FIG. 4(*a*).

FIG. 6 is a diagram explaining how a lateral electric field is exerted at the pore portion.

FIG. 7(*a*) is a cross-sectional view of the liquid crystal panel, and FIG. 7(*b*) is a perspective view of spacers.

FIG. 9(a) is a diagram showing a front view of a display apparatus 300 which includes a liquid crystal panel 310 according to the present invention, and FIG. 9(b) is a cross-sectional view of FIG. 9(a).

FIG. 10(a) is a diagram showing an example in which a light-shielding tape is applied to the display apparatus 300, and FIG. 10(b) is a cross-sectional view of FIG. 10(a).

FIG. 11(a) is a diagram showing a front view of a display apparatus 400 which includes a liquid crystal panel 410 according to the present invention, and FIG. 11(b) is a cross-sectional view of FIG. 11(a).

FIG. 12(a) is a diagram showing an example in which a light-shielding tape is applied to the display apparatus 400, and FIG. 12(b) is a cross-sectional view of FIG. 12(a).

DETAILED DESCRIPTION OF THE PREFERRED EMBODIMENT

Figure 2A:
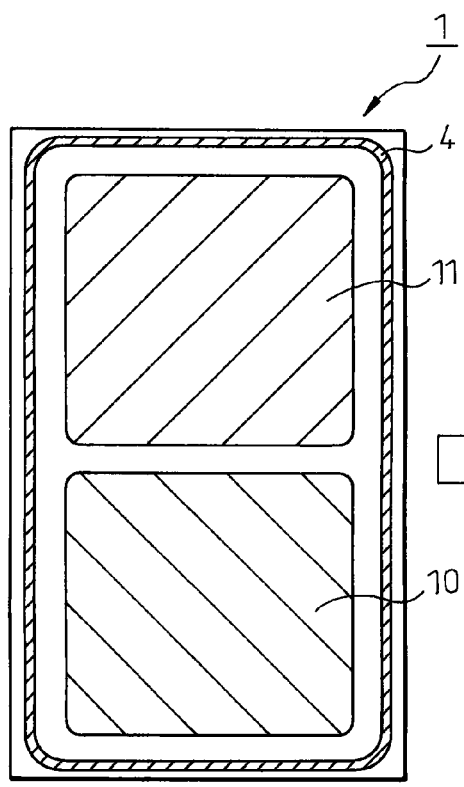
FIG. 2(*a*) is a diagram showing one example of a front view of the liquid crystal panel, and FIG. 2(*b*) is a cross-sectional view of FIG. 2(*a*).

Liquid crystal panels according to the present invention will be described below with reference to the drawings.

FIG. 3 is a diagram schematically showing the construction of a display apparatus 100 which includes a liquid crystal panel 110 according to the present invention.

FIG. 3(a) shows the front surface of the display apparatus 100, and FIG. 3(b) shows a cross-sectional view taken along line AA' in FIG. 3(a). Here, it should be noted that the drawings are for illustrative purposes and are not necessarily drawn to scale.

As shown in FIG. 3, the display apparatus 100 comprises, in addition to the liquid crystal panel 110, a frame member 111, an adhesive layer 112 for bonding the liquid crystal panel 110 to the frame member 111, and a display section 150.

The liquid crystal panel 110 includes an overlay (outermost layer) 101, a first plastic substrate 102, a sealing member 104, a second plastic substrate 106, a plurality of spacers 107 arranged so as to maintain prescribed spacing between the first and second plastic substrates, and a liquid crystal layer 109 sealed between the first and second plastic substrates by the sealing member. A first transparent electrode pattern 120 and a first alignment film 103 are formed on the first plastic substrate 102, while a second transparent electrode pattern 121 and a second alignment film 105 are formed on the second plastic substrate 106. A commonly used TN (Twisted Nematic) liquid crystal or the like is used for the liquid crystal layer 109.

The first and second plastic substrates 102 and 106 are each formed from a flexible polycarbonate resin with a thickness of 100 μm. However, the first and second plastic substrates 102 and 106 are not limited to this particular material, but use may be made of a modified acrylic resin, a polymethacrylate resin, a polyether sulfone resin, a polyethylene terephthalate resin, a ??? resin, or the like, and the thickness may be set to a suitable thickness within a range of 50 μm to 250 μm.

The first and second transparent electrode patterns 120 and 121 are each formed by sputtering a transparent conductive film of ITO to a thickness of about 0.03 μm over the first or second transparent substrate 102 or 106, respectively, and then etching away unwanted portions. The first and second transparent electrode patterns 120 and 121 form a first patterned region 130 corresponding to the display section 150, a second patterned region 133 containing character patterns 131, graphical patterns 132, etc., and a third patterned region 134 encircling the first and second regions. Wiring lines are provided to the respective patterned regions, etc. so that a prescribed voltage is applied from a display drive controller (not shown) of the display apparatus 100, but the wiring lines are not shown in FIG. 3. It is assumed here that the first and second transparent electrode patterns 120 and 121 in the liquid crystal panel 110 are patterned in the same shape. However, one of the first and second transparent electrode patterns 120 and 121 may be left unpatterned. Further, the patterns shown in the second patterned region 133 in FIG. 3(a) are only examples, and patterns of other shapes such as matrix patterns may be formed.

The liquid crystal panel 110 is constructed so that the liquid crystal layer switches between transmissive mode and non-transmissive mode when a prescribed voltage is applied between the first and second transparent electrode patterns.

When the prescribed voltage is applied across the first patterned region 130, the liquid crystal layer 109 in the corresponding portion switches to the transmissive mode so that the display produced on the display section 150 disposed behind the liquid crystal panel 110 becomes visible.

On the other hand, when the prescribed voltage is applied across the plurality of patterns (characters A, B, and C, circular buttons, etc.) in the region 133, the liquid crystal layer 109 in the corresponding portion switches to the transmissive mode or the non-transmissive mode so that the characters and graphical and other patterns become visible.

FIG. 4 is a diagram showing an example in which a light-shielding tape is applied to the display apparatus 100.

FIG. 4(a) shows the front surface of the display apparatus 100, and FIG. 4(b) shows a cross-sectional view taken along line AA' in FIG. 4(a). It should be noted that the drawings are for illustrative purposes and are not necessarily drawn to scale. Further, in FIG. 4(a), the sealing member 104 is omitted for convenience of illustration.

The light-shielding tape 160 is attached to the overlay 101 of the liquid crystal panel 110 in such a manner as to cover the peripheral portions (edges) of the liquid crystal panel 110 which in effect do not contribute to the display or operation.

Next, a description will be given of the structure for preventing the formation of bubbles in the liquid crystal panel 110 according to the present invention.

Figure 2B:
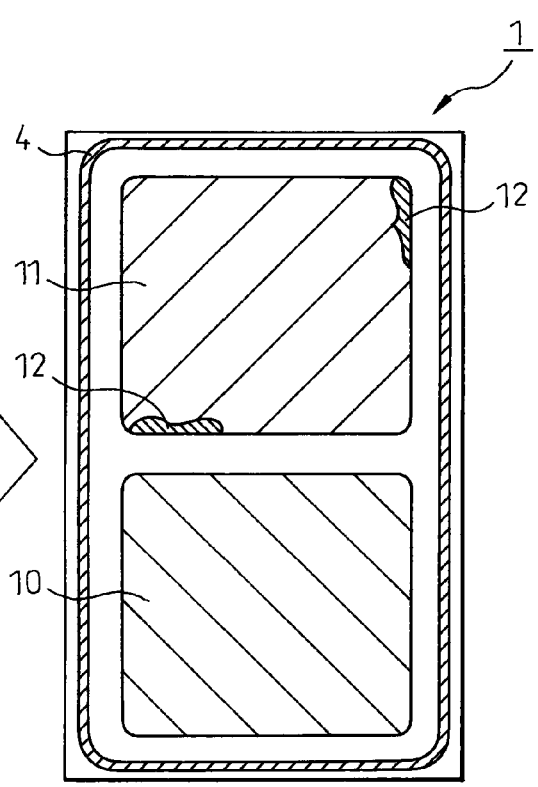

As previously described with reference to FIGS. 1 and 2, in the first patterned region 130 where the transparent conductive films are usually left unetched (the transparent conductive films are formed all over and there are very few interstices), the gas does not easily infiltrate into the liquid crystal layer 109, but once the gas infiltrates, it is not easily vented and tends to form gas bubbles. If bubbles are formed in this region, the bubbles interfere with the production of a clear display in such cases as when viewing the display on the display section 150 in the transmissive mode, which is not desirable.

In view of this, fine pores 141 as openings are formed in the entire area of the first patterned region 130 so that the gas infiltrated into the liquid crystal layer 109 can be easily vented through the fine pores 141. An enlarged view of a portion 140 of the first patterned region 130 is shown in FIG. 3(a). As shown in the enlarged view portion 140, numerous fine pores 141 each having a diameter R are formed in the transparent conductive films. In the liquid crystal panel 110, the diameter R of each fine pore 141 is chosen to be 10 μm, but any suitable diameter within the range of 50 μm to 0.1 μm can be selected as the fine pore diameter. Since fine pores of diameter of the order of 100 μm may become visible to the human eye, the upper limit of the fine pore diameter R is set to 50 μm. Further, since bubbles can be vented sufficiently even when the pore diameter is small, the lower limit of the fine pore diameter R is set to 0.1 μm which can be realized by stepper exposure or the like.

Here, the gas venting fine pores 141 provided in the first patterned region 130 need not necessarily be formed in a circular shape, but they may be formed in other suitable shape such as a polygonal shape, slit-like shape, etc. However, it is preferable to form the fine pores in the shape and size that are not recognizable by the human eye.

In the region 133, since the plurality of patterns 131 and 132 for producing characters and graphical patterns are formed, the transparent conductive films in this region have many openings through which the gas can be vented sufficiently, so that fine pores are not formed in this region. However, fine pores may also be formed in the region 133.

On the other hand, the third patterned region 134 is the edge region that is outside the first patterned region 130 and hidden behind the light-shielding seal 160; therefore, if bubbles were formed in the liquid crystal layer 109 in this region, they would, in most cases, not present much of a problem. However, since this region is adjacent to the first patterned region 130, if the gas dwelling in the third patterned region 134 could be vented outside, the chance of the gas accumulating in the first patterned region 130 could be correspondingly reduced. In view of this, as in the first patterned region 130, fine pores 143 are also formed in the entire area of the third patterned region 134 so that the gas infiltrated into the liquid crystal layer 109 can be easily vented through the fine pores 143. An enlarged view of a portion 142 of the third patterned region 134 is shown in FIG. 3(a). The diameter, etc., of the fine pores 143 are the same as those in the first patterned region 130.

As shown in FIGS. 3 and 4, since the openings for venting the gas trapped in the liquid crystal layer 109 are provided not only in the first patterned region 130 where the transparent conductive films are usually left unetched (the transparent conductive films are formed all over and there are very few interstices) but also in the third patterned region 134 outside it, the liquid crystal panel 110 thus constructed can reduce the accumulation of gas and prevent the formation of gas bubbles.

Generally, the visually recognizable pixel size, i.e., the size of each region formed by patterning, is larger than about 200 μm square. Regions formed from the transparent electrode material but smaller than this pixel size are wiring regions, etc. and are adjacent in the same plane to regions where the transparent electrode material is not formed. Accordingly, bubbles formed in the latter regions can move into the substrate base member through the interstices of the transparent electrode material regions. Further, since bubbles larger than about 100 μm in diameter usually present a problem in viewability, openings should be provided in the patterned regions when each region formed by patterning is larger than about 200 μm square.

Since display defects larger than about 100 μm in diameter present a problem in viewability, as just described, it is preferable to make each opening smaller than about 100 μm square. The opening size may be made as small as a few micrometers, although how small it can be made depends on the performance of the manufacturing equipment used. When the opening size is small, it is preferable to increase the number of openings.

FIG. 5 is a diagram showing examples of the arrangement of the fine pores.

Figure 5A:
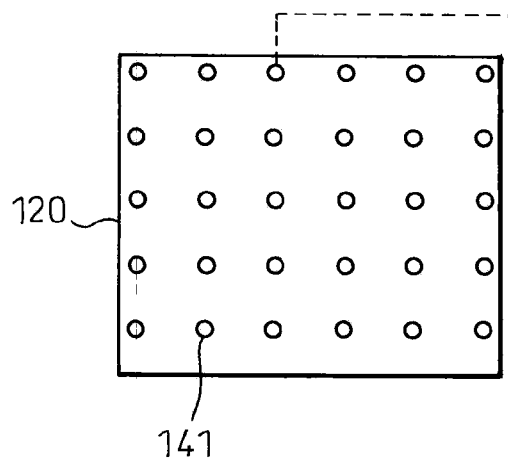
FIG. 5(*a*) is a diagram showing an example of the arrangement of fine pores in a first transparent electrode pattern 120, FIG. 5(*b*) is a diagram showing an example of the arrangement of fine pores in a second transparent electrode pattern 121 corresponding to the arrangement of FIG. 5(*a*), FIG. 5(*c*) is a diagram showing an alternative example of the arrangement of fine pores in the first transparent electrode pattern 120, and FIG. 5(*d*) is a diagram showing an example of the arrangement of fine pores in the second transparent electrode pattern 121 corresponding to the arrangement of FIG. 5(*c*).
Figure 5B:
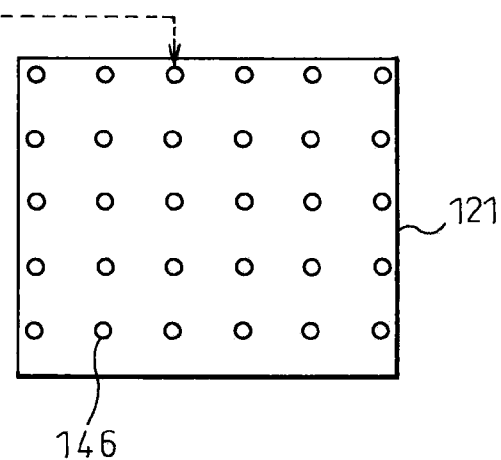
Figure 5C:
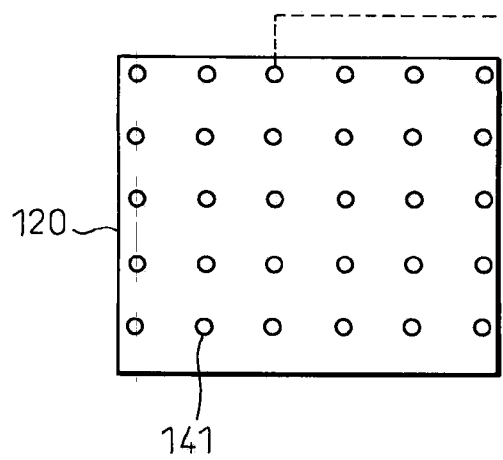
Figure 5D:
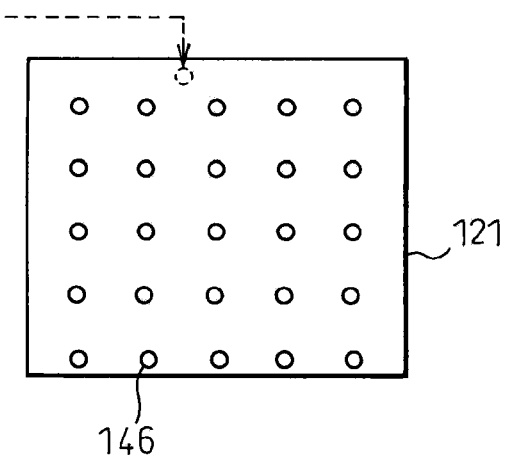

FIGS. 5(a) and 5(b) show examples of the arrangement of the fine pores in the liquid crystal panel 110, and FIGS. 5(c) and 5(d) show alternative examples of the arrangement of the fine pores.

FIG. 5(a) shows an example of the arrangement of the fine pores 141 formed in the portion of the first transparent electrode pattern 120 corresponding to the first patterned region 130. FIG. 5(b) shows an example of the arrangement of the fine pores 146 formed in the portion of the second transparent electrode pattern 121 corresponding to the first patterned region 130. As shown in FIGS. 5(a) and 5(b), the fine pores are arranged so as to face each other precisely one for one between the first and second transparent electrode patterns. In the portions where the fine pores are formed, the voltage cannot be accurately applied across the liquid crystal layer 109, and the liquid crystal layer 109, therefore, cannot be controlled to switch between the transmissive mode and the non-transmissive mode. In view of this, the fine pores are formed so as to face each other precisely one for one between the first and second transparent electrode patterns in order to minimize the number of portions where the voltage cannot be controlled.

FIG. 5(c) shows an alternative example of the arrangement of the fine pores 141 formed in the portion of the first transparent electrode pattern 120 corresponding to the first patterned region 130 in the liquid crystal panel. FIG. 5(d) shows an alternative example of the arrangement of the fine pores 146 formed in the portion of the second transparent electrode pattern 121 corresponding to the first patterned region 130 in the liquid crystal panel. As shown in FIGS. 5(c) and 5(d), the fine pores are arranged so as not to face each other one for one between the first and second transparent electrode patterns. When the fine pore diameter is as small as 10 μm to 1 μm, if there is a transparent electrode at a position opposite a fine pore, a lateral electric field is exerted and it is possible to control the liquid crystal layer 109 at that position. In view of this, when the fine pore diameter R is particularly small, the fine pores of the first and second transparent electrode patterns 120 and 121 are arranged in a staggered manner so that they do not face each other precisely one for one.

In the above example, the fine pores are formed in both the first and second transparent electrode patterns 120 and 121, but the fine pores may be formed only in one or the other of them.

FIG. 6 is a diagram explaining how a lateral electric field is exerted at the pore portion.

In the first patterned region 130, a lateral electric field producing electric lines of force such as those indicated at 201 in the figure is exerted between the fine pore 141 formed in the first transparent electrode pattern 120 and the second transparent electrode pattern 121 at the position opposite the fine pore 141, thus making it possible to control the liquid crystal layer 109 at this position to switch between the transmissive mode and the non-transmissive mode despite the presence of the fine pore 141.

Similarly, in the first patterned region 130, a lateral electric field producing electric lines of force such as those indicated at 202 in the figure is exerted between the fine pore 146 formed in the second transparent electrode pattern 121 and the first transparent electrode pattern 120 at the position opposite the fine pore 146, thus making it possible to control the liquid crystal layer 109 at this position to switch between the transmissive mode and the non-transmissive mode despite the presence of the fine pore 146.

FIG. 7 is a diagram showing a further alternative example of the arrangement of the pores.

FIG. 7(a) shows a cross-sectional view of the liquid crystal panel, and FIG. 7(b) shows a perspective view of the spacers.

As earlier described, in the portions where the fine pores are formed (especially when the fine pore diameter R is 10 μm to 50 μm), the voltage cannot be accurately applied across the liquid crystal layer 109, and the liquid crystal layer 109, therefore, cannot be controlled to switch between the transmissive mode and the non-transmissive mode. Further, in the liquid crystal panel, the plurality of spacers 107 are provided to maintain the spacing between the plastic substrates, but in the portions of the spacers 107 also, it is difficult to control the liquid crystal layer 109 to switch between the transmissive mode and the non-transmissive mode. In view of this, in the example of FIG. 7, the fine pores are formed so as to encircle the respective spacers 107 so that the spacers 107 are accommodated in the respective fine pores. In this case, each fine pore becomes annular in shape, but the fine pores need not be limited to the annular shape, but may take other shapes.

As shown in FIGS. 7(a) and 7(b), the spacers 107 are placed in the respective fine pores 146 formed in the portion of the second transparent electrode pattern 121 corresponding to the first patterned region 130, and are bonded to the first transparent electrode pattern 120 and the second plastic substrate 106. This arrangement allows the gas to exit through the fine pores 146, while making effective use of the portions adjacent to the spacers 107 which would otherwise be difficult to utilize. In FIG. 7(b), the first transparent electrode pattern 120 and the first plastic substrate 102 to which the spacers 107 are bonded are not shown. In the above example, the fine pores are formed in the second transparent electrode pattern 121, but it is also possible to form the fine pores in the first transparent electrode pattern 120.

Figure 8:
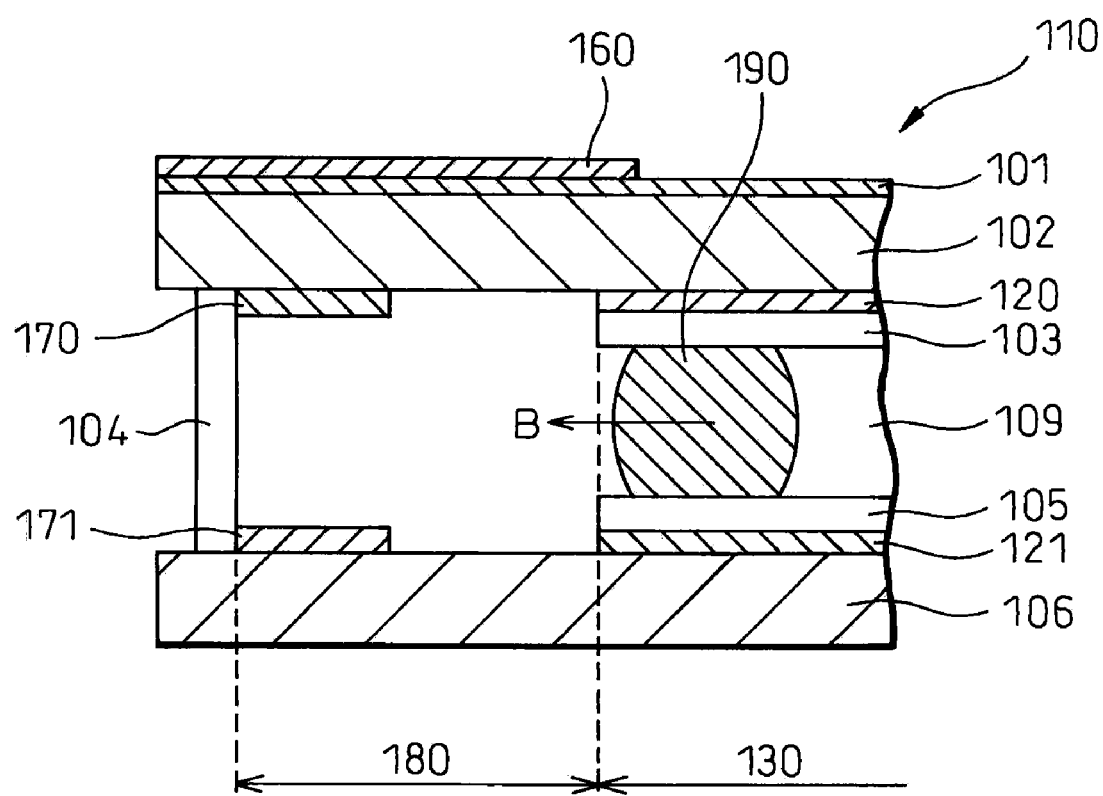
FIG. 8 is a diagram explaining an alternative method for utilizing a peripheral region.

FIG. 8 is a diagram explaining an alternative method for utilizing the peripheral region.

In FIGS. 3 and 4, the fine pores are also formed in the third patterned region 134 which is the region peripheral to the first patterned region 130. By contrast, in the modified example shown in FIG. 8, a region 180 for venting bubbles is provided in the region peripheral to the first patterned region 130. Further, dummy transparent electrode films 170 and 171 are provided in a portion of the region 180.

The gas 190 infiltrated into the liquid crystal layer 109 tends to move toward a portion where the cell gap (the spacing between the substrates) is larger in the liquid crystal layer 109. In view of this, when the region 180 where neither transparent conductive films nor alignment films are formed is provided around the first patterned region 130, the gas 190 infiltrated into the liquid crystal layer 109 moves into the region 180 (see arrow B). Since neither transparent conductive films nor alignment films are formed, the bubbles collected in this region are vented outside the liquid crystal layer 109 through the plastic substrates. Since the region 180 is provided in the edge region hidden behind the light-shielding seal 160, if bubbles remain in this region, such bubbles are not likely to impair the function of the liquid crystal panel 110.

The structure of FIG. 8 can be used in place of the third patterned region 134 in the liquid crystal panel 110 shown in FIGS. 3 and 4.

FIG. 9 is a diagram schematically showing the construction of an alternative display apparatus 300 which includes an alternative liquid crystal panel 310 according to the present invention.

FIG. 9(a) shows the front surface of the display apparatus 300, and FIG. 9(b) shows a cross-sectional view taken along line AA' in FIG. 9(a). It should be noted that the drawings are for illustrative purposes and are not necessarily drawn to scale.

In FIG. 9, the same component elements as those in FIG. 3 are designated by the same reference numerals, and the description of such component elements will not be repeated here. The only difference between the liquid crystal panel 310 shown in FIG. 9 and the liquid crystal panel 110 shown in FIG. 3 is that the liquid crystal panel 310 shown in FIG. 9 includes gas barrier layers. That is, a first gas barrier layer 301 is provided on the viewer side of the first plastic substrate 102 of the liquid crystal panel 310, a second gas barrier layer 302 is provided on the side of the first plastic substrate 102 that faces the liquid crystal layer 109, a third gas barrier layer 303 is provided on the side of the second plastic substrate 106 that faces the liquid crystal layer 109, and a fourth gas barrier layer 304 is provided on the side of the second plastic substrate 106 that faces the display section 150.

The gas barrier layers are formed on both sides of each of the first and second plastic substrates 102 and 106, but a sufficient effect can be obtained if only the gas barriers layers 302 and 303 are formed on the respective substrates, that is, on their inside surfaces that face the liquid crystal layer 109.

As in the liquid crystal panel 110, the liquid crystal panel 310 is constructed so that the liquid crystal layer switches between the transmissive mode and the non-transmissive mode when a prescribed voltage is applied between the first and second transparent electrode patterns.

FIG. 10 is a diagram showing an example in which a light-shielding tape is applied to the display apparatus 300.

FIG. 10(a) shows the front surface of the display apparatus 300, and FIG. 10(b) shows a cross-sectional view taken along line AA' in FIG. 10(a). Here, it should be noted that the drawings are for illustrative purposes and are not necessarily drawn to scale. Further, in FIG. 10(a), the sealing member 104 is omitted for convenience of illustration.

In the illustrated example, as in the example shown in FIG. 4, the light-shielding tape 160 is attached to the overlay 101 of the liquid crystal panel 310 in such a manner as to cover the peripheral portions (edges) of the liquid crystal panel 310 which in effect do not contribute to the display or operation.

The gas barrier layers 301 to 304 used in the liquid crystal panel 310 will be described below.

Either organic or inorganic gas barrier layers may be used in the liquid crystal panel 310. When forming an inorganic gas barrier layer on the flexible substrate surface, the gas barrier layer is formed to a thickness of several hundred angstroms so that the gas barrier layer will not break when bent. This thickness is about one-tenth of the thickness generally believed to be required to provide a sufficient gas barrier performance, and cannot be said to be sufficient to block the infiltration of gas into the substrate.

On the other hand, an organic gas barrier layer is effective from the standpoint of ensuring the flexibility of the flexible substrate, but its gas permeability is not very low. As a result, a small quantity of gas migrates back and forth between the liquid crystal layer and the flexible substrate. Generally, when the gas concentration in the liquid crystal layer and the gas concentration in the substrate base member are in equilibrium with the atmosphere, bubbles are not formed in the liquid crystal layer; if bubbles are formed due to a temperature rise or an impact or the like, some of them are dissolved into the liquid crystal layer, and if the transparent conductive film layer in the patterned region is large in area, the gas is absorbed into the substrate through the opening formed in the transparent conductive film layer. In this case, since the gas permeability of the gas barrier layer is not so low, the gas barrier layer allows the gas in the liquid crystal layer to pass through and move into the substrate slowly though it does not take a long period of time. In like manner, thermal equilibrium is slowly attained between the atmosphere and the substrate.

As described above, the gas barrier layers 301 to 304 used in the liquid crystal panel 310 function to slow the gas exchange rate. Further, when the gas suddenly tries to flow into the liquid crystal layer from the substrate side, such as when the substrate base member is temporarily bent, tending to eject the gas, the gas barrier layers 301 to 304 function to mitigate the flow of the gas into the liquid crystal layer and thereby prevent the formation of bubbles.

The function of preventing the formation of bubbles in the liquid crystal panel 310 according to the present invention is the same as that of the earlier described liquid crystal panel 110, and therefore, the description will not be repeated.

Examples of the arrangement of the fine pores 141 and 146 in the liquid crystal panel 310 are the same as those shown in FIGS. 5(a) and 5(b). It is also possible to arrange the fine pores 141 and 146 in the liquid crystal panel 310 as shown in FIGS. 5(c) and 5(d). In that case, the lateral electric field acting at the pore portion is the same as that described with reference to FIG. 6. Further, in the liquid crystal panel 310, the fine pores may not be provided in both of the first and second transparent electrode patterns 120 and 121, but may be provided only in one or the other of them.

In the liquid crystal panel 310 also, the fine pores may be formed so as to encircle the respective spacers 107, as previously shown in FIG. 7. In that case, each fine pore becomes annular in shape, but the fine pores need not be limited to the annular shape, but may have other shapes.

FIG. 11 is a diagram schematically showing the construction of a further alternative display apparatus 400 which includes a further alternative liquid crystal panel 410 according to the present invention.

FIG. 11(a) shows the front surface of the display apparatus 400, and FIG. 11(b) shows a cross-sectional view taken along line AA' in FIG. 11(a). Here, it should be noted that the drawings are for illustrative purposes and are not necessarily drawn to scale.

In FIG. 11, the same component elements as those in FIG. 3 are designated by the same reference numerals, and the description of such component elements will not be repeated here. The difference between the liquid crystal panel 410 shown in FIG. 11 and the liquid crystal panel 110 shown in FIG. 3 is that, in the liquid crystal panel 410 shown in FIG. 11, fine pores 421 of various diameters R are formed at random positions in the transparent conductive film 120.

As in the liquid crystal panel 110, the liquid crystal panel 410 is constructed so that the liquid crystal layer switches between the transmissive mode and the non-transmissive mode when a prescribed voltage is applied between the first and second transparent electrode patterns.

FIG. 12 is a diagram showing an example in which a light-shielding tape is applied to the display apparatus 400.

FIG. 12(a) shows the front surface of the display apparatus 400, and FIG. 12(b) shows a cross-sectional view taken along line AA' in FIG. 12(a). Here, it should be noted that the drawings are for illustrative purposes and are not necessarily drawn to scale. Further, in FIG. 12(a), the sealing member 104 is omitted for convenience of illustration.

In the illustrated example, as in the example shown in FIG. 4, the light-shielding tape 160 is attached to the overlay 101 of the liquid crystal panel 410 in such a manner as to cover the peripheral portions (edges) of the liquid crystal panel 410 which in effect do not contribute to the display or operation.

The function of preventing the formation of bubbles in the liquid crystal panel 410 according to the present invention is the same as that of the earlier described liquid crystal panel 110, and therefore, the description will not be repeated here.

An enlarged view of a portion 422 of the third patterned region 134 is shown in FIG. 11(a). The diameter, etc. of the fine pores 423 are the same as those in the first patterned region 130. In the third patterned region 134 which does not contribute to the display, it is preferable to provide fine pores of larger diameter.

Since the fine pores 421 that serve as openings in the first patterned region 130 are arranged in a random manner, the liquid crystal panel can function as an optical shutter that does not generate interference fringes irrespective of the emission periodicity of the display elements disposed behind it.

FIG. 13 is a diagram showing examples of the arrangement of the fine pores.

Figure 13A:
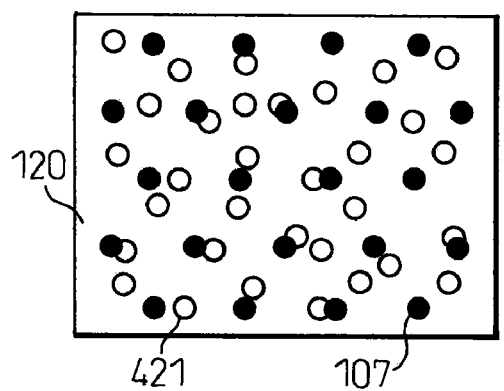
FIG. 13(a) is a diagram showing an example of the arrangement of the fine pores and spacers.

FIG. 13(a) shows an example of the arrangement of the fine pores 421 and spacers 107 provided in the portion of the first transparent electrode pattern 120 corresponding to the first patterned region 130. As shown in FIG. 13(a), the fine pores 421 are not arranged at a regular pitch, but arranged in a random manner. This arrangement serves to prevent the formation of interference fringes that occur depending on the matching between the periodicity of the unevenness in the rising of the liquid crystal layer near the fine pores 421 and the emission periodicity of the display elements, such as color filters, disposed behind it.

Figure 13B:
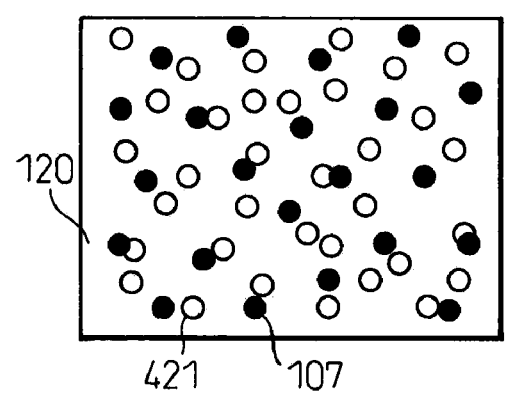
FIG. 13(b) is a diagram showing another example of the arrangement of the fine pores and spacers.

FIG. 13(b) shows another example of the arrangement of the fine pores 421 and spacers 107 provided in the portion of the first transparent electrode pattern 120 corresponding to the first patterned region 130. As shown in FIG. 13(b), neither the fine pores 421 nor the spacers 107 are arranged at a regular pitch, but both are arranged in a random manner. This arrangement serves to prevent the formation of interference fringes that occur depending on the matching between the periodicity of the fine pores 421 and spacers 107 and the emission periodicity of the display elements disposed behind them. The arrangement shown in FIG. 13(b) may be used in the liquid crystal panel 410 in place of the arrangement shown in FIG. 13(a).

Figure 13C:
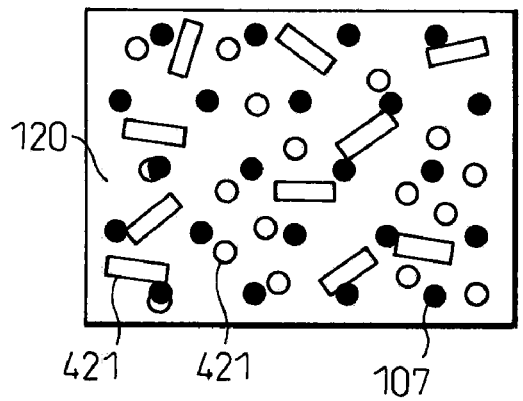
FIG. 13(c) is a diagram showing still another example of the arrangement of the fine pores and spacers.

FIG. 13(c) shows still another example of the arrangement of the fine pores 421 and spacers 107 provided in the portion of the first transparent electrode pattern 120 corresponding to the first patterned region 130. As shown in FIG. 13(c), the fine pores 421 have two different kinds of shapes, and they are not arranged at a regular pitch, but arranged in a random manner. This arrangement serves to better prevent the formation of interference fringes that occur depending on the matching between the periodicity of the unevenness in the rising of the liquid crystal layer near the fine pores 421 at the time of display and the emission periodicity of the display elements disposed behind it. The arrangement shown in FIG. 13(c) may be used in the liquid crystal panel 410 in place of the arrangement shown in FIG. 13(a).

Figure 13D:
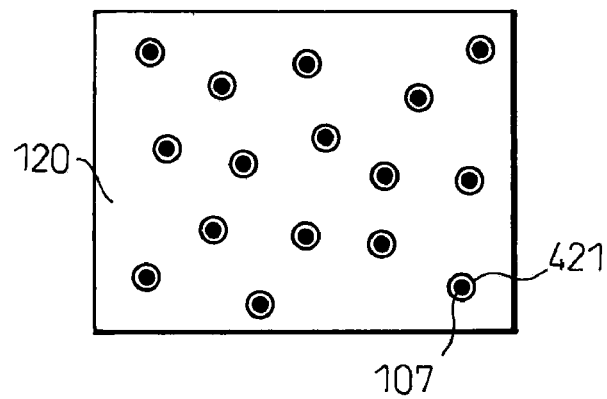
FIG. 13(d) is a diagram showing yet another example of the arrangement of the fine pores and spacers.

FIG. 13(d) shows yet another example of the arrangement of the fine pores 421 and spacers 107 provided in the portion of the first transparent electrode pattern 120 corresponding to the first patterned region 130. As shown in FIG. 13(d), the spacers 107 are placed in the respective fine pores 421 formed in the portion of the first transparent electrode pattern 120 corresponding to the first patterned region 130. This arrangement allows the gas to exit through the fine pores 421, while making effective use of the portions adjacent to the spacers 107 which would otherwise be difficult to utilize. The arrangement shown in FIG. 13(d) may be used in the liquid crystal panel 410 in place of the arrangement shown in FIG. 13(a).

In the examples shown in FIGS. 13(a) to 13(d), the fine pores have been described as being provided in the first transparent electrode pattern formed on the first plastic substrate, but similar fine pores may be provided in the second transparent electrode pattern formed on the second plastic substrate. As a matter of course, such fine pores may be provided in both the first and second transparent electrode patterns. When the fine pores are formed in a variety of shapes or arranged in a random manner in both the first and second transparent electrode patterns, the resulting effect is greater than when the fine pores are provided only in one or the other of the transparent electrode patterns.

The lateral electric field acting at the pore portion is the same as that described earlier.

Similar spacers to those used in the liquid crystal panel 110 can be used as the spacers 107 here.

FIG. 14 is a diagram showing alternative examples of the arrangement of the fine pores.

Figure 14A:
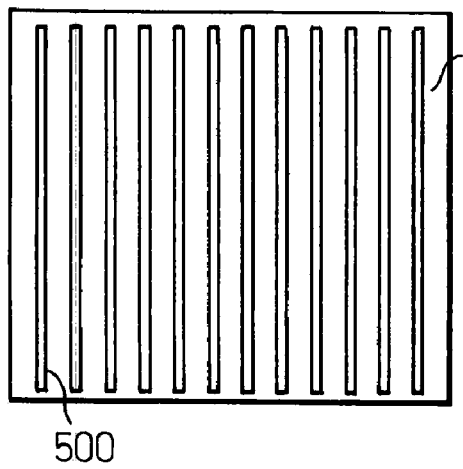
FIG. 14(a) is a diagram showing an alternative example of the arrangement of the fine pores.

FIG. 14(a) shows an alternative example of the arrangement of the fine pores provided in the portion of the first transparent electrode pattern 120 corresponding to the first patterned region 130. The arrangement shown in FIG. 14(a) may be used in the liquid crystal panel 410 in place of the arrangement shown in FIG. 13(a). In FIG. 14(a), the spacers 107 are not shown, but the spacers 107 can be suitably arranged in a random or periodic manner. In the example shown in FIG. 14(a), slit-like fine pores 500 are formed at equally spaced intervals in the first transparent electrode pattern 120. The length of each slit-like fine pore 500 may be suitably chosen. In the example of FIG. 14(a) also, since the gas infiltrated into the liquid crystal layer 109 can be vented through the fine pores 500, the liquid crystal panel 410 thus constructed can reduce the accumulation of gas and prevent the formation of gas bubbles.

Figure 14C:
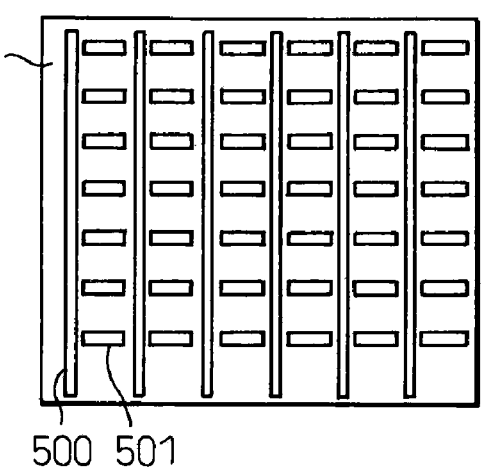
FIG. 14(c) is a diagram showing still another alternative example of the arrangement of the fine pores.
Figure 14B:
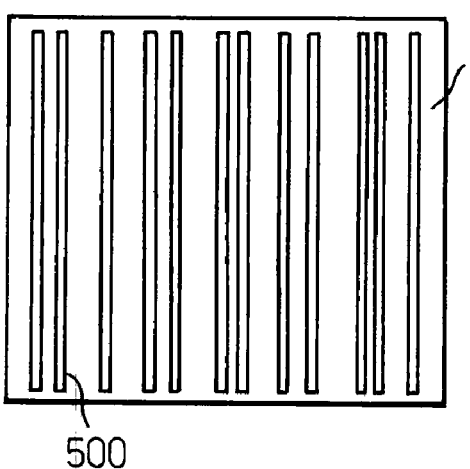
FIG. 14(b) is a diagram showing another alternative example of the arrangement of the fine pores.

FIG. 14(b) shows another alternative example of the arrangement of the fine pores provided in the portion of the first transparent electrode pattern 120 corresponding to the first patterned region 130. The arrangement shown in FIG. 14(b) may be used in the liquid crystal panel 410 in place of the arrangement shown in FIG. 13(a). In FIG. 14(b), the spacers 107 are not shown, but the spacers 107 can be suitably arranged in a random or periodic manner. In the example shown in FIG. 14(b), the slit-like fine pores 500 are formed at unequally spaced intervals in the first transparent electrode pattern 120. The length of each slit-like fine pore 500 may be suitably chosen. In the example of FIG. 14(b) also, since the gas infiltrated into the liquid crystal layer 109 can be vented through the fine pores 500, the liquid crystal panel 410 thus constructed can reduce the accumulation of gas and prevent the formation of gas bubbles.

FIG. 14(c) shows still another alternative example of the arrangement of the fine pores provided in the portion of the first transparent electrode pattern 120 corresponding to the first patterned region 130. The arrangement shown in FIG. 14(c) may be used in the liquid crystal panel 410 in place of the arrangement shown in FIG. 13(a). In FIG. 14(c), the spacers 107 are not shown, but the spacers 107 can be suitably arranged in a random or periodic manner. In the example shown in FIG. 14(c), the slit-like fine pores 500 are formed at equally spaced intervals in the first transparent electrode pattern 120, along with rectangular pores 501 which are arranged between each slit-like fine pore 500. The length of each slit-like fine pore 500 and the size of each rectangular pore 501 may be suitably chosen. In the example of FIG. 14(c) also, since the gas infiltrated into the liquid crystal layer 109 can be vented through the fine pores 500 and 501, the liquid crystal panel 410 thus constructed can reduce the accumulation of gas and prevent the formation of gas bubbles.

Figure 14D:
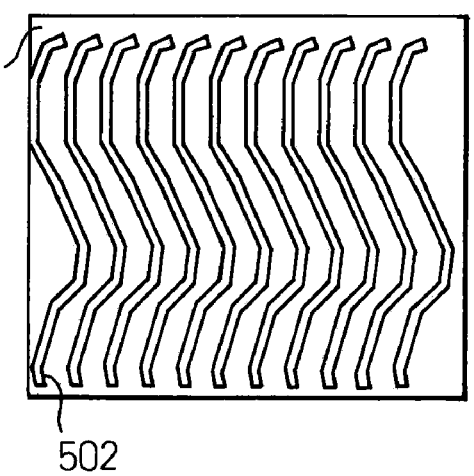
FIG. 14(d) is a diagram showing yet another alternative example of the arrangement of the fine pores.

FIG. 14(d) shows yet another alternative example of the arrangement of the fine pores provided in the portion of the first transparent electrode pattern 120 corresponding to the first patterned region 130. The arrangement shown in FIG. 14(d) may be used in the liquid crystal panel 410 in place of the arrangement shown in FIG. 13(a). In FIG. 14(d), the spacers 107 are not shown, but the spacers 107 can be suitably arranged in a random or periodic manner. In the example shown in FIG. 14(d), nonlinearly shaped fine pores 502 are formed at equally spaced intervals in the first transparent electrode pattern 120. The size and length of each nonlinearly shaped fine pore 502 may be suitably chosen. In the example of FIG. 14(d) also, since the gas infiltrated into the liquid crystal layer 109 can be vented through the fine pores 502, the liquid crystal panel 410 thus constructed can reduce the accumulation of gas and prevent the formation of gas bubbles.

What is claimed is:

1. A liquid crystal panel comprising:
    a first plastic substrate;
    a second plastic substrate;
    a liquid crystal layer sealed between said first and second plastic substrates;
    a transparent conductive layer provided on said first or said second plastic substrate, and having a patterned region for driving said liquid crystal layer; and
    an opening provided in the patterned region of said transparent conductive layer and having a size that permits gas trapped in said liquid crystal layer to escape into said first or said second plastic substrate.

2. The liquid crystal panel according to claim 1, further comprising a spacer disposed between said first and second plastic substrates, and wherein
    said opening is provided so as to encircle said spacer.

3. The liquid crystal panel according to claim 1, wherein said transparent conductive layer includes a first transparent conductive layer provided on said first plastic substrate and having a first patterned region, and a second transparent conductive layer provided on said second plastic substrate and having a second patterned region, and wherein
    said opening is provided in each of said first and second transparent conductive layers.

4. The liquid crystal panel according to claim 3, wherein said opening provided in said first transparent conductive layer and said opening provided in said second transparent conductive layer are disposed so as to face each other.

5. The liquid crystal panel according to claim 3, wherein said opening provided in said first transparent conductive layer and said opening provided in said second transparent conductive layer are disposed so as not to face each other.

6. The liquid crystal panel according to claim 1, further comprising an edge portion, and wherein
    an opening is provided in a portion of said transparent conductive layer which corresponds to said edge portion.

7. The liquid crystal panel according to claim 1, wherein said opening has a width of 0.1 μm to 50 μm.

8. The liquid crystal panel according to claim 1, further comprising a gas barrier layer at least on a side of each of said first and second plastic substrates which faces said sealed liquid crystal layer.

9. The liquid crystal panel according to claim 8, wherein said gas barrier layer is provided on both sides of each of said first and second plastic substrates.

10. The liquid crystal panel according to claim 1, wherein said patterned region is larger than 200 μm square.

11. The liquid crystal panel according to claim 1, wherein said opening includes a plurality of kinds of openings of different sizes.

12. The liquid crystal panel according to claim 1, wherein said opening is arranged in a random manner.

* * * * *